United States Patent Office 3,770,823
Patented Nov. 6, 1973

3,770,823
OXYPERFLUOROMETHYLENE POLYMERS
Franco Gozzo, Via Don Griffanti 1, and Giorgio Carraro, Via Damiano Chiesa 8, both of Saronno, Italy
No Drawing. Continuation-in-part of application Ser. No. 420,718, Dec. 23, 1964, now Patent No. 3,392,097. This application Apr. 4, 1968, Ser. No. 718,917
Claims priority, application Italy, Jan. 2, 1964, 5/64, Patent 42,565
Int. Cl. C07c 59/22
U.S. Cl. 260—535 H          2 Claims

ABSTRACT OF THE DISCLOSURE

Oxyperfluoromethylene polymers consisting essentially of —$CF_2O$— chains and head-to-tail succession and having a molecular weight in excess of 1000 with main infrared-absorption peaks at substantially 1035 and 1225 cm.$^{-1}$.

---

This application is a continuation-in-part of our application Ser. No. 420,718 filed Dec. 23, 1964, now U.S. Pat. No. 3,392,097, issued July 9, 1968.

The present invention relates to the product of a process for the preparation of organic fluorine derivatives; more particularly, it is directed to a process for preparing organic fluorine compounds containing oxygen.

An object of this invention is to provide a process for preparing new organic fluorinated products containing oxygen.

A further object of this invention is that of obtaining organic fluorinated products containing oxygen with an improved process.

According to the process of this invention, tetrafluoroethylene and oxygen are reacted with each other in gaseous phase, in the presence of ultraviolet radiation, at a temperature between —30° C. and +150° C. and at pressures below 2 ata. (i.e. atmospheres absolute).

Using this process, a reaction mixture is obtained which, at room temperature and at atmospheric pressure, is composed of gaseous, liquid and solid products.

The gaseous products that are separated from the reaction mixture by means of known methods are found to consist essentially of carbonyl fluoride ($COF_2$), perfluorocyclopropane $(CF_2)_3$, carbon dioxide and a new product to which, from consideration of its chemical and chemical-physical behavior, may be assigned the formula of tetrafluoroethylene oxide or tetrafluoroethylene epoxide

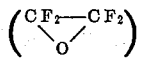

also confirmed by mass-spectral analysis.

The tetrafluoroethylene oxide or epoxide, which is contained in the gaseous fraction of the raw reaction product, may be conveniently isolated by first letting the acid components contained in the gaseous fraction be absorbed by oxides of alkaline-earth metals, then subjecting the residual gas to condensation and subsequent fractional distillation, and finally collecting the fraction which has its boiling point around —64° C. at atmospheric pressure.

At the elemental analysis the tetrafluoroethylene epoxide shows the following average composition: C=20.6%, F=64.8%.

Its molecular weight, as determined by diffusion methods with the mass spectrometer, turns out to be 116.

It is slowly hydrolyzed by water forming hydrofluoric and oxalic acid in a molar ratio of 4:1; it does not liberate iodine from an aqueous acidic solution of potassium iodide.

The infrared spectrum (see FIG. 1 of U.S. Pat. 3,392,097) shows the following main absorption bands (in cm.$^{-1}$): 1285; 1163; 1129; 791; 694.

In working with the process of this invention, besides the above-mentioned gaseous products, there also are formed products that at atmospheric pressure and at room temperature are liquid.

These liquids, separated from the reaction mixture by conventional techniques, have a density around 1.79 with a refraction index between 1.28 and 1.29.

The liquids are miscible with various fluorinated solvents.

The elemental analysis has shown that they contain only carbon, fluorine and oxygen in slightly variable percentages depending on the ratio at which tetrafluoroethylene and oxygen are made to react.

When a tetrafluoroethylene-oxygen mixture is used in a molar ratio of 2:1, a liquid reaction product is obtained from whose elemental analysis it is possible to derive the following empirical formula:

$$[CF_2O]_n$$

The quantity of peroxidic oxygen contained in such products, measurable from the iodine freed through heat treatment with an acid solution of potassium iodide or hydroiodic acid in acetic acid, is a very small fraction of the oxygen present and is independent of the ratio at which the reacting gases are fed into the reactor.

The infrared spectrum of these liquid products shows a wide and intense absorption band in the range from 1000 cm.$^{-1}$ to 1400 cm.$^{-1}$ with two main peaks at 1035 cm.$^{-1}$ and 1225 cm.$^{-1}$, besides a weaker band at 1885 cm.$^{-1}$ attributable to —COF groups.

Some processes of separation carried out on those liquid products have proved that they are formed of mixtures of compounds of various molecular weights, whose mean value generally exceeds 1000.

Such liquid raw products are subjected to a treatment with substances of a basic nature whereby the separation of the neutral components from those of an acid nature is possible.

In fact it has been found that by treating the raw reaction liquids with alkaline solutions, it is possible to achieve a separation of the neutral products from the relatively acidic products; only these latter give rise to water-soluble salts.

From the alkaline solutions it is then possible, by acidification with mineral acids and by extraction with solvents, followed by distillation, to recover the liquid products of acidic nature.

An infrared spectrum of such products is represented in FIG. 2 of U.S. Pat. 3,392,097. In that spectrum the absorption band at 1795 cm.$^{-1}$ evidences the presence of —COOH groups.

The part of raw liquid which is of a neutral character remains stable at temperatures up to nearly 200° C.; at temperatures greater than this the neutral liquid decomposes, thereby developing $COF_2$ and $CF_3$—O—$CF_3$.

The neutral raw liquid shows an elemental composition from which can be deduced the aforestated empirical formula: $[CF_2O]_n$.

Analysis by gas chromatography showed the presence of numerous compounds, whose average molecular weight, determined in a hexafluorobenzene solution at 37° C., proved to be greater than 1000.

The infrared spectrum of the raw liquid (see FIG. 3 of U.S. Pat. 3,392,097) differs from that of the liquids of acidic nature (see FIG. 2 of U.S. Pat. 3,392,097) essentially in that there is a substantial absence of the characteristic band of the —COOH groups.

An analysis by mass spectrometer shows the following ionic species to prevail: $COF_2^+$, $CF_3^+$, $C_2F_3O^+$, $C_2F_5^+$, $C_2F_5O^+$, $C_3F_5O_2^+$, $C_3F_7O^+$, $C_3F_7O_2^+$, $C_3F_5O^+$.

The percentage of peroxidic oxygen, as determined from the quantity of iodine developed through treatment with an aqueous acid solution of potassium iodide heated to boiling, is found to be less than one part by weight per hundred parts of liquid.

From various studies undertaken on these liquid products (raw reaction liquid, fractions of neutral and of acidic nature), it was possible to formulate a hypothesis on their constitution.

In fact, considering their empirical formula, the small percentage of peroxidic oxygen present in them, and the substantial absence of oxalic acid among the products both of alkaline hydrolysis and of hydrolysis in a reducing medium, it is possible to assume a basic structure, apart from the end groups, consisting of a head-tail succession of units of the formula $—CF_2—O—$ (polyoxyperfluoromethylenes), i.e. a system substantially free from

—C—C— units.

These structures, which are found in the products obtained through the process according to this invention in the form of carboxylic acids and of neutral products, are new as they had never been described so far either in the technical or in the scientific literature.

Compounds having these structures may be profitably used in various fields of application as solvents, emulsifiers, surfactants and intermediates.

In the process of this invention, besides gaseous and liquid products, solid products are also formed. These products may be separated from the liquid fraction by extraction with perfluorinated solvents.

FIG. 4 of U.S. Pat. 3,392,097 exemplifies the spectrum of a product after extraction with solvents.

Such a spectrum differs from the characteristic spectrum of the polytetrafluoroethylene by the presence of the absorption band at 1040 cm.$^{-1}$.

In the effectuation of this invention, the ultraviolet radiations which have proved to be the most suited are those of wavelengths between 1800 A. (angstrom units) and 3000 A., such as for instance those wavelengths which are emitted by a low-pressure mercury-vapor lamp, hydrogen-gas lamp, xenon-gas lamp, etc.

The molar ratio at which tetrafluoroethylene and oxygen are made to react, according to the process of this invention, varies between 4:1 and 0.25:1. Within that range the preferred molar ratio is chosen according to the product obtainable whose yield should be at a maximum.

The temperature at which the process of this invention is carried out does not seem to be critical; as a matter of fact satisfactory results are obtained by operating in the range of temperatures lying between $-30°$ C. and $+150°$ C. However, the preferred temperatures for the purposes of this invention are between $+20°$ C. and $+85°$ C.

The exposure time of the mixture of reacting gases to ultraviolet radiation, which is determined by the flow velocity of the mixture in the zone exposed to the ultraviolet radiation, also may vary within a wide time interval. It was also found that when modifying the composition of the reacting mixture and by varying its temperature or, above all, varying the intensity and distribution spectral characteristics of the ultraviolet radiation used, it is desirable for the purpose of a satisfactory operation of the process of this invention to modify the exposure time accordingly.

Thus, for instance, when operating with an ultraviolet-radiation source capable of delivering a luminous energy at 2537 A., of 25 mW./cm.$^2$ of radiating surface, the flow-speed of the reacting mixture calculated at 0° C. and under atmospheric pressure is such that the exposure time should range between 8 and 60 minutes.

The following examples are given for a better illustration of the process of this invention.

EXAMPLE 1

The equipment used consists of a 25 cm. long vertical cylindrical reactor with an internal diameter of 3.1 cm. wherein there is a mercury-vapor quartz lamp of the low-pressure type, marketed under the trademark "Actinozon" and produced by Helios Ray of Milan. Said mercury lamp is also of a cylindrical shape and is arranged along the midaxis of the reactor of which it occupies almost the whole length.

The annular irradiated space which can be occupied by the reacting gases amounts to about 150 cc.

The temperature of the reactor is maintained at the established values by means of externally circulating oil, heated separately, which also feeds the gas-preheater at the inlet.

The lower or bottom end of the reactor is shaped into a funnel and is connected through a short inclined pipe to a collecting container for the discharged high-boiling liquid and solid products.

A side pipe, entering into the reactor at the level of the lower end of the mercury lamp, allows the outlet of the gaseous reaction products.

These latter, after being passed through a calcium oxide tower, are collected in a dry gasometer which measures their volume and from which, at the end of each test, a sample is drawn for a chromatographic gas analysis.

In the following table are recorded all conditions at which the above-described method is carried out as well as the results obtained.

TABLE

| Number test | Reacting gas temperature, °C. | Pressure in mm. Hg | Flow speed, cc./h., S.T.P. | Molar ratio $C_2F_4$:$O_2$ | Conversion of $C_2F_4$, percent | Gr. of product per 100 gr. of converted $C_2F_4$ | | | |
|---|---|---|---|---|---|---|---|---|---|
| | | | | | | Solid | Liquid, raw | $C_2F_4O$ | Cycle $C_3F_6$ |
| 1 | +25 | 805 | 422 | 2:1 | 59.1 | Traces | 22 | 28 | 2.3 |
| 2 | +85 | 811 | 412 | 2:1 | 66 | 9.3 | Traces | 40 | 6.1 |
| 3 | +60 | 837 | 597 | 1.5:1 | 56.8 | Traces | 30.2 | 52 | 2 |
| 4 | −20 | 765 | 387 | 1:1 | 25.4 | Traces | 16.2 | 25 | Traces |
| 5 | +40 | 831 | 420 | 1:1 | 64.3 | Traces | 32.1 | 35 | 3 |
| 6 | +40 | 833 | 303 | 1:1 | 90.2 | Traces | 43 | 16 | Traces |
| 7 | +60 | 822 | 600 | 1:2 | 73 | 1 | 36 | 33 | 3 |

For the infrared spectrum see FIG. 1 of U.S. Pat. 3,392,097.

1.35 grams of liquid raw product, obtained under the conditions of test No. 7 and containing 18% C. and 52% F., is treated in a nitrogen atomosphere, with 20 cc. of glacial acetic acid and 1 cc. of HI. After heating the mixture with stirring for 1 hour, the same is diluted with 100 cc. of deaerated water and titrated with sodium thiosulphate 0.1 N. The quantity of thiosulphate used corresponded to a percentage of 0.11 equivalents of peroxidic oxygen present in the raw reaction liquid.

After titration, the aqueous solution, separated from the organic layer, was neutralized and treated with calcium chloride. A precipitate was thus obtained which was then separated from the solution, washed and treated with a solution of $H_2SO_4$ in the proportion of 1:1.

The acid solution thus resulting, after being freed by filtration from the solid residue, was titrated using $3.10^{-4}$ equivalents of potassium permanganate.

EXAMPLE 2

A mixture of $C_2F_4$ and $O_2$ in a molar ratio of 2:1 at a pressure of 820 mm. Hg and at a temperature of 50° C.

was fed at a flow rate of 4 N 1/hr. into an apparatus similar to that described in Example 1, in which the ultraviolet radiation source was a Westinghouse type G36T6H lamp having an absorbed power of 17 watts and a specific luminous intensity at 2537 A. of 25 mw./cm$^2$.

After 8 hrs. of processing, 13 grams of liquid product were collected, which had a refraction index of $n=1.288$ and density $$d_{20}^{20} = 1.79$$

Elemental analysis gave the following data (percent): C=18.7, or 18.8 or 18.9. F=57.2 or 58.

The gaseous products which had formed at the same time, were freed of the $COF_2$ and $CO_2$ components through treatment with calcium oxide and barium oxide and then condensed and distilled.

18 grams of tetrafluoroethylene epoxide is thus obtained which, at ambient pressure, is distilled at $-64.5°$ C. Furthermore, 50 grams of unreacted tetrafluoroethylene is recovered.

EXAMPLE 3

15 grams of raw liquid, obtained as described in Example 2, is treated with 100 cc. of a boiling NaOH 3 N solution so as to distill the neutral volatile components in vapor stream.

After a few hours of such a treatment, during which distilled water is added to the boiling mixture in successive stages, an organic liquid not miscible with the aqueous layer is gathered in the distillate. This liquid, after anhydration, weighs 4 grams and, upon elementary analysis, yields the following data: C=17.3%, F=57.8%.

The liquid has an average molecular weight of 1070, a refraction index of $n=1.281$ and an infrared spectrum identical with that shown in FIG. 3 of U.S. Pat. 3,392,097.

The alkaline mixture left in the boiler, after cooling, is extracted with ethyl ether.

The ethereal extract, after anhydration and elimination of the solvent, yields 4.5 grams of an organic oxyfluorinated residue, partly liquid and partly solid.

The average molecular weight of the liquid part of this extract amounts to about 1,200.

The alkaline solution remaining after extraction with ether is then acidified with concentrated hydrochloric acid and subsequently extracted with ether.

After separation of the ethereal extract, anhydration and elimination of the solvent, 2 grams of an oxyfluorinated product are obtained which is of an acidic nature and is partly solid and partly liquid.

Elementary analysis of the liquid part of this product gave the following results: C=20%; F=52.9%.

Such a substance possesses an infrared spectrum shown in FIG. 2 (U.S. Pat. 3,392,097).

EXAMPLE 4

3.7 grams of solid product, obtained under the same conditions as prevailed in Test 2 of Example 1, were extracted in a Kumagawa-type extractor with 60 cc. of perfluoromethylcyclohexane. Thereby 2.3 grams of solid polymer residue, showing the infrared spectrum of FIG. 4 (U. S. Pat. 3,392,097) was obtained.

We claim:
1. Liquid linear-oxyperfluoromethylene polymers consisting essentially of neutral or acidic chains of structural units —$CF_2O$— in head-to-tail sequence and substantially free from —C—C-groups in or between said structural units, the acidic chains having carboxylic-acid terminal groups as determined by an absorption band at 1795 cm.$^{-1}$ in its infrared spectrum, said polymers having a mean molecular weight in excess of 1000 and being formed by passing a reaction mixture of tetrafluoroethylene and oxygen in a molar ratio between 4:1 and 0.25:1 through a radiation zone subjected to ultraviolet radiation at a wavelength of 1800 A. to 3000 A. at a temperature between $-30°$ C. and $+150°$ C. at a pressure up to 2 atmospheres absolute to produce a product mixture and recovering the oxyperfluoromethylene polymers therefrom.

2. Oxyperfluoromethylene polymers as defined in claim 1 having a mean molecular weight in excess of 1000 and an intense infrared absorption band at 1000 to 1400 cm.$^{-1}$ with main peaks at 1035 and 1225 cm.$^{-1}$.

References Cited

UNITED STATES PATENTS

| | | | |
|---|---|---|---|
| 3,242,218 | 3/1966 | Miller | 260—535 H |
| 3,250,806 | 5/1966 | Warnell | 260—535 |
| 3,271,341 | 9/1966 | Garrison | 260—535 H |

LORRAINE A. WEINBERGER, Primary Examiner

P. J. KILLOS, Assistant Examiner

U.S. Cl. X.R.

204—159.22; 260—538, 544 F, 648 F